United States Patent [19]

Swanson

[11] 4,402,549

[45] Sep. 6, 1983

[54] RECEPTACLE LIFT APPARATUS

[75] Inventor: William C. Swanson, Clarendon Hills, Ill.

[73] Assignee: International Harvester Co., Chicago, Ill.

[21] Appl. No.: 219,404

[22] Filed: Dec. 22, 1980

[51] Int. Cl.³ .............................................. B60P 1/16
[52] U.S. Cl. ...................................... 298/18; 92/75; 92/117 A; 92/146; 298/22 P
[58] Field of Search .................... 298/11, 18, 22 P; 91/216 R, 217; 92/75, 117 R, 117 A, 165 PR, 146; 187/8, 59

[56] References Cited

U.S. PATENT DOCUMENTS

| | | | |
|---|---|---|---|
| 1,891,051 | 12/1932 | Neese | 92/75 X |
| 2,795,934 | 6/1957 | Jenkins | 92/75 X |
| 2,795,935 | 6/1957 | Fitzgerald | 92/75 X |
| 4,059,942 | 11/1977 | Trimble et al. | 298/18 X |

*Primary Examiner*—Leslie J. Paperner
*Attorney, Agent, or Firm*—Dennis K. Sullivan; F. D. Aubuchon

[57] ABSTRACT

A receptacle lift apparatus for a cotton harvester or other dumping vehicle including a linear hydraulic motor including a first rod and piston assembly attached to the receptacle and a second rod and piston assembly attached to the chassis and a floating cylindrical housing receiving the first piston in one end and the second piston in the other end being independent of the chassis and receptacle for axially unrestrained movement relative thereto.

3 Claims, 6 Drawing Figures

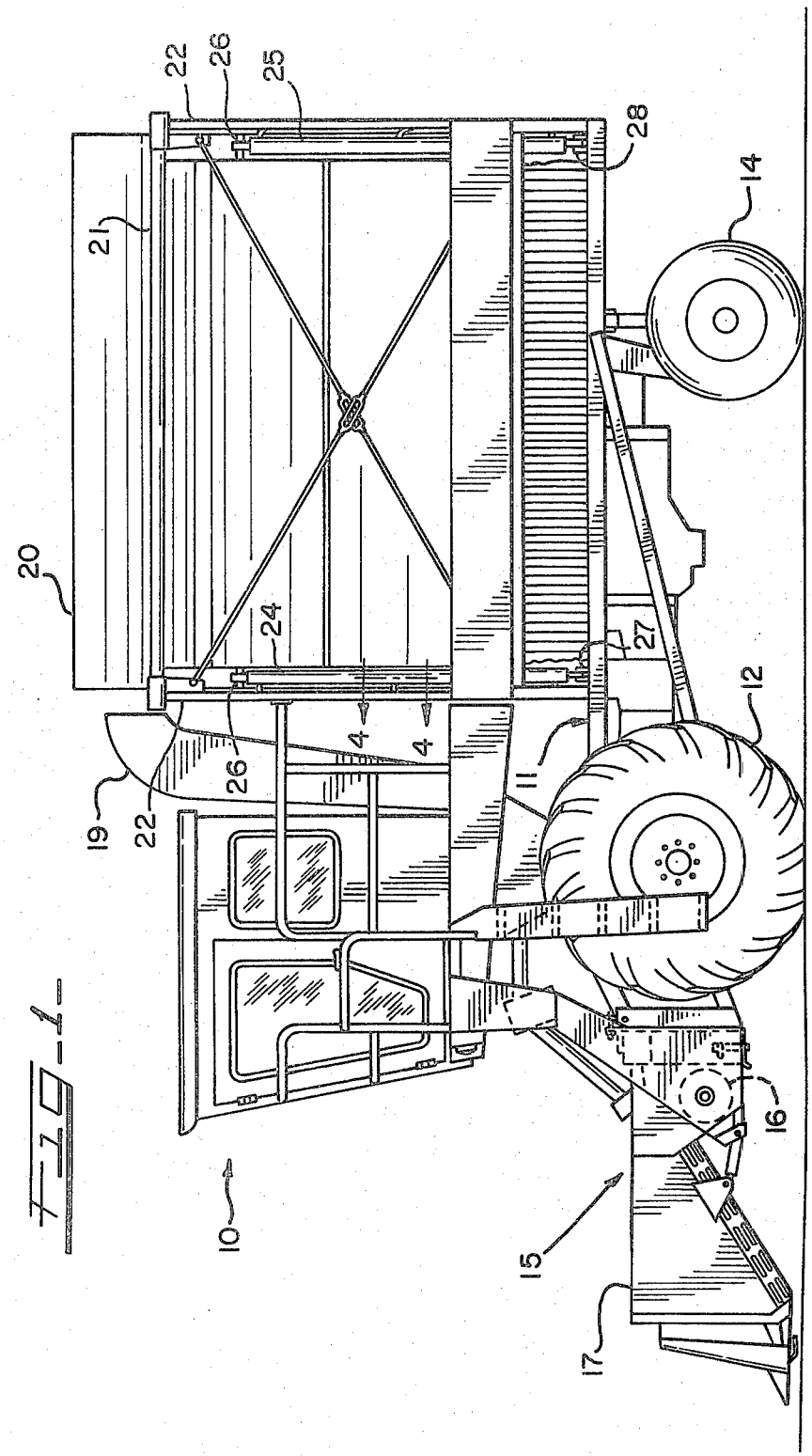

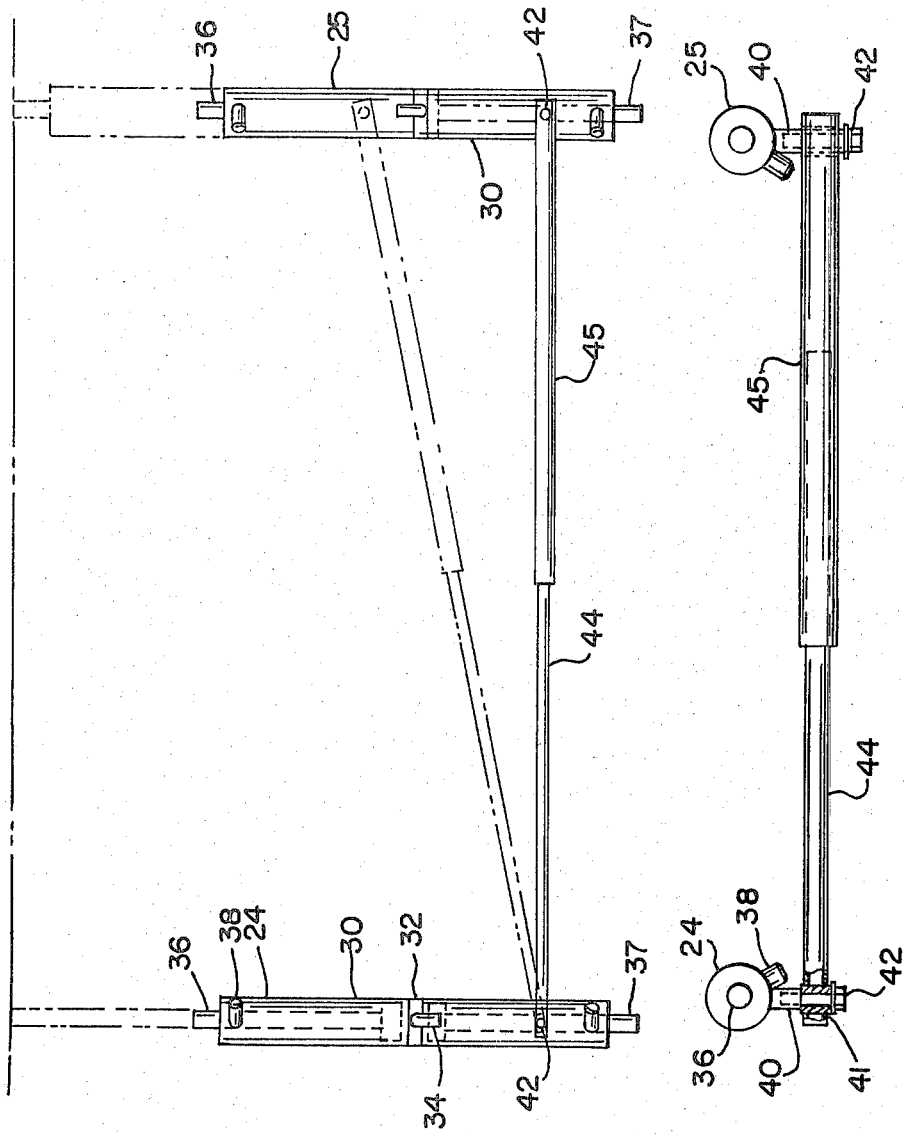

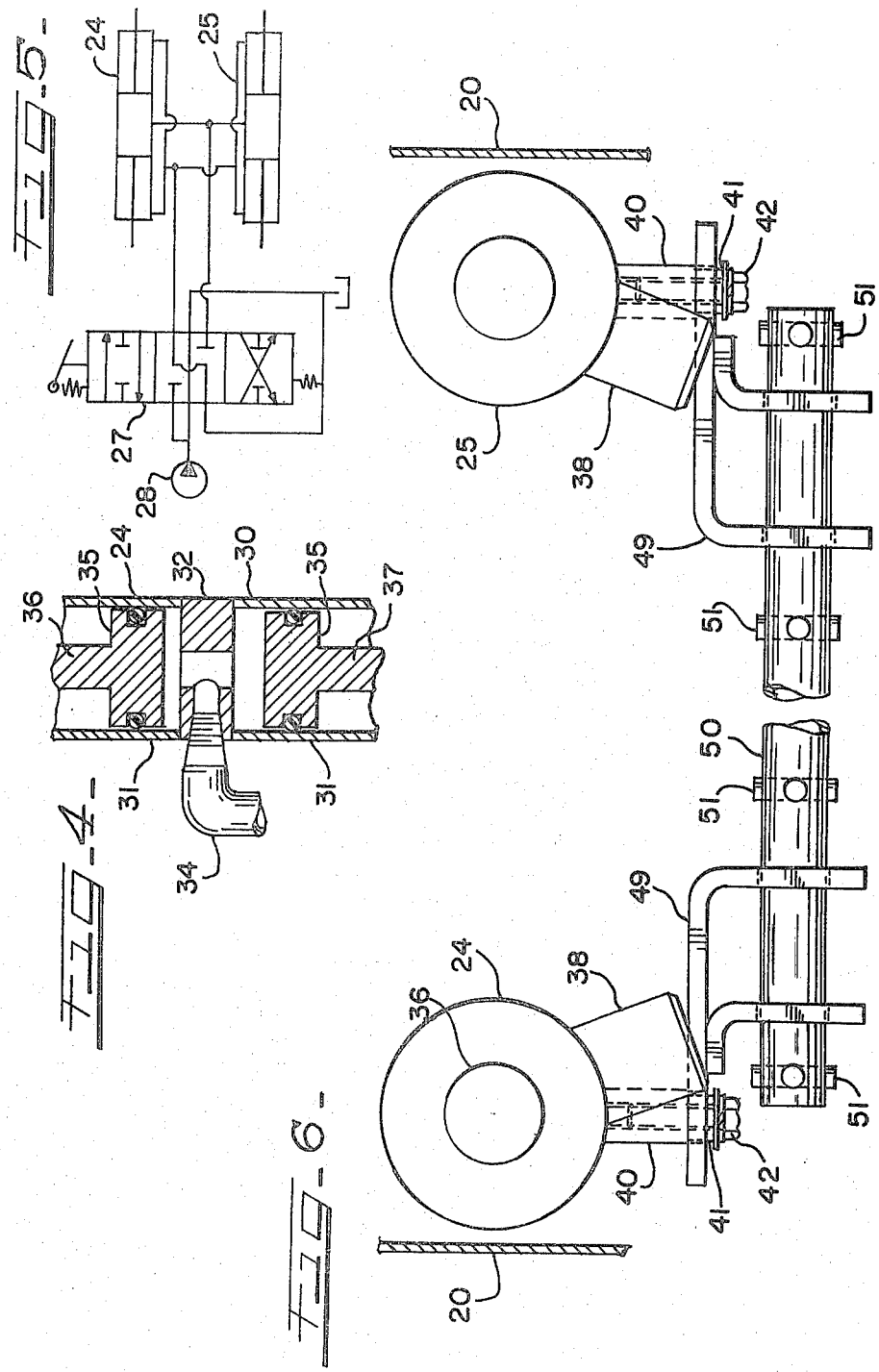

RECEPTACLE LIFT APPARATUS

CROSS REFERENCE TO RELATED APPLICATION

This application is related to application Ser. No. 219,000, filed concurrently herewith by Robert M. Fachini, Michael J. Covington, and Jesse H. Orsborn and assigned to the assignee hereof, now U.S. Pat. No. 4,341,423.

BACKGROUND OF THE INVENTION

This invention is related to cotton harvesters and other vehicles, such as high dump wagons, of the type having a receptacle or basket mounted thereon which elevates and dumps the cotton or other material from the vehicle and more particularly, to an improvement in the hydraulic lift apparatus for the receptacle wherein a special linear hydraulic motor is utilized which will permit the safe handling of the loaded receptacle while allowing rods of smaller diameter to be used.

Previous cotton harvesters, such as that described in U.S. Pat. No. 4,059,942, have utilized a pair of simple hydraulic cylinders or linear motors interconnecting the basket and harvester frame at the front and rear ends of the basket which extend to cause the basket to elevate and pivot about a horizontal axis near the top of the basket. Typically, the stroke of the motor in this application is quite long and the load is substantial. Although the required stroke and lifting force are the determining factors of the length of the cylindrical housing and the piston diameter in a given hydraulic system, in basket lifting applications, the stroke is so long that the diameter of the rod is primarily influenced by its ability to withstand buckling rather than its strength in compression.

SUMMARY OF THE INVENTION

Accordingly, it is an object of the invention described herein to provide a receptacle lift apparatus for cotton harvesters and other elevatable receptacle vehicles having an improved linear hydraulic lifting motor wherein the buckling factor is substantially reduced.

Specifically, the above object and others as may hereafter appear is met in a cotton harvester having a mobile frame, a receptacle supported on the frame and adapted to be elevated therefrom for dumping, a linear hydraulic lifting motor interconnecting the frame and the receptacle including a first piston and rod assembly wherein the rod is connected to the frame, a second piston and rod assembly independent of the first assembly wherein the second rod is connected to the receptacle, and a floating cylindrical housing slidably receiving the first and second pistons in its respective ends, the housing being axially unrestrained by the frame and the receptacle, and hydraulic circuitry for simultaneously pressurizing the heads of both pistons from a single control valve.

DETAILED DESCRIPTION OF THE DRAWINGS

In the drawings:

FIG. 1 is a side view partially cutaway of a cotton harvester employing the invention;

FIG. 2 is a schematic view of the linear hydraulic motors of FIG. 1 and the housing rotation restraining apparatus therefor, illustrating the range of relative movements of the housings of the two motors;

FIG. 3 is a view of the linear hydraulic motors and restraining apparatus of FIG. 2 viewed axially of the linear motors;

FIG. 4 is a longitudinal cross section of one of the linear motors of FIG. 1 taken along the line 4—4 thereof;

FIG. 5 is a hydraulic schematic for operating the basket lift apparatus; and,

FIG. 6 is a view similar to FIG. 3 but illustrating an alternative embodiment for restraining rotational movement of the hydraulic cylinder housings.

DETAILED DESCRIPTION OF THE INVENTION

Referring to the drawings, there is shown in FIG. 1 a self-propelled cotton harvester generally designated 10 having a chassis or main frame 11 supported in fixed vertical relation to the ground by a pair of transversely spaced front drive wheels 12 and rear steerable wheels 14. Carried on the chassis forwardly of the drive wheels 12 is a header assembly generally 15 including a transverse conveying auger 16 which receives crops harvested by a plurality of harvesting units 17. The drive for the transverse conveying auger and harvesting units is provided by a conventional means mounted on chassis 11. Harvested cotton is conveyed from the transverse conveying auger 16 rearwardly through a center outlet into a conveying system partially shown at 19 into basket or receptacle 20 mounted on top of the rear portion of the chassis 11. the receptacle 20 is pivoted for rotation about a fore-and-aft extending horizontal shaft 21 which is supported at its forward and rearward ends on the chassis 11 by upstanding frame members 22. A pair of linear hydraulic motors 24 and 25 are respectively attached as by pins 26 to the forward and rearward portions of the basket 20 and extend downwardly to pinned connections with the chassis 11 as at 27 and 28 respectively. As shown in FIG. 5, the linear hydraulic motors are of the double acting type and are interconnected through a single conventional three position control valve 27 to the hydraulic pump 28 of the cotton harvester 10 for simultanous actuation such that the receptacle 20 is elevated from the chassis 11 and pivoted about the shaft 21 to dump material contained in the receptacle to the side of the harvester 10. It will be recognized that the foregoing is a general description of a conventional stripper type cotton harvester of the type shown, for example, in the aforementioned U.S. Pat. No. 4,059,942.

The stroke required from the motors 24 and 25 plus the extension or additional length of the rods of the motors 24, 25 beyond that required for the stroke should be in excess of about 13.9 times the minimum diameter of the rods. Otherwise, the critical load for buckling, as determined by Euler's long column formula, exceeds the yield strength of the medium carbon steel commonly used in these rods and a simple linear motor may be sufficient. As a practical matter, the rod extension is generally so small compared to the stroke that it may be ignored. The above criterion is met in most cotton harvesters, the stroke being about 39 times the rod diameter in the machine described.

Referring now to FIGS. 2, 3 and 4, it will be seen that the linear hydraulic motor 24 comprises an elongated cyindrical housing 30 which may be constructed of a pair of cylinder sections 31, preferably of equal inside diameter and length, welded to opposite sides of a common head plate 32 disposed midway between the ends of the cylindrical housing 30, the head plate 32 being ported to receive hydraulic fluid through a fitting 34 and distribute it on both sides thereof. It will be further seen that the head plate functions as a stop for the two independent hydraulic pistons 35 of preferably equal diameter and stroke which are slidably disposed in the cylindrical housing sections 31 on either side of the head plate 32 and which are connected respectively to upper and lower rods 36 and 37 which extend outwardly of the ends of the housing 30. Suitable sealing means are provided, in accordance with the art, for the rods 36, 37, and pistons 35.

As seen in FIG. 3, in addition to the hydraulic connectors or port bosses 38, the linear hydraulic motor 24 is also provided with a radially extending boss 40 welded thereto to its housing 30. A spacer 41 is disposed about and drawn up against the boss 40 by a bolt 42. One end of a guide tube 44 is journalled on the spacer 41 and extends from the housing 30 of the motor 24 to a distal end telescopingly engaged with a larger guide tube 45 pivotally attached to the housing of the motor 25 in the same manner that the tube 44 is attached to the housing 30.

In operation, when the cotton harvester control valve 27 is actuated, hydraulic fluid will be simultaneously introduced into the motors 24, 25 through the ports 34 and head plates 32, thus simultaneously pressurizing the head of each piston 35 to extend both the rod 36 and the rod 37 relative to the housing 30 to raise the receptacle. It will be seen that the stroke of either of the rods 36 and 37 is half of the stroke which would be required for a simple cylinder to achieve the same extension. Thus, the critical column load for buckling in accordance with Euler's column formulas becomes increased by a factor of four and becomes considerably greater than the compressive yield strength of the rod material. It will further be seen from FIG. 2, which illustrates in phantom half the stroke of the motors 24 and 25, that because the cylindrical housings 30 are axially unrestrained relative to the frame and because the rods 36 and 37 are independent of each other, either one piston rod or the other may extend at a greater rate. Theoretically, the housings 30 of the respective motors 24 and 25 could be out of phase by as much as half the total stroke of the cylinders, which is the situation illustrated in phantom in FIG. 2. In order to accommodate this out of phase relationship, the telescoping guide tubes 44 and 45, which prevent the cylindrical housings 30 of the motors 24 and 25 from rotating relative to the frame of the cotton harvester, extend in length to accommodate the housing variation and thus do not restrain the axial movement thereof.

Referring now to FIG. 6, there is shown an alternate embodiment of the rotation restraining device illustrated in FIG. 3. An "F" shaped bracket 49 has its long arm journalled on the spacer 41 for rotation relative to the housing 30 hydraulic motor 24. The short arms of the "F" shaped bracket 49 are provided with apertures which receive one end of a guide tube 50, the guide tube being provided with roll pins on either side of the "F" shaped bracket 49 to form a lost motion sliding connection between the guide tube 50 and the bracket 49. The other end of the guide tube 50 is similarly journalled in a second "F" shaped bracket 49 attached to the housing of the other hydraulic motor 25. The lost motion connections provided by the roll pins 51 at both ends of the tubes are sufficient to accommodate the motors 24 and 25 being totally out of phase, as shown in phantom in FIG. 2. Operation of the alternative embodiment is substantially the same as the embodiment shown in FIG. 3.

Thus, there has been described in accordance with the invention a receptacle lift apparatus which fully meets the objects and advantages set forth above. It is anticipated that those of ordinary skill in the art will recognize that certain changes might be made without departing from the true spirit of the invention. Accordingly, it is intended to embrace all such modifications as may come within the scope of the appended claims.

What is claimed is:

1. In a receptacle dumping vehicle, a mobile chassis, a receptacle mounted on said chassis in a manner permitting elevation of the bottom portion of the receptacle from said chassis, a hydraulic power means including a control valve operatively associated with said vehicle, a linear hydraulic motor having a first rod pivotally connected to said receptacle and attached to a first piston, a second rod pivotally attached to said chassis and attached to a second piston, and a cylindrical housing slidably receiving said first piston in one end and said second piston in the other end, said housing being independent of said chassis and said receptacle for unrestrained movement in the axial direction relative thereto, and a hydraulic circuit connecting said hydraulic motor to said control valve and disposed to provide simultaneous pressurization of the heads of both pistons in response to said control valve.

2. The invention in accordance with claim 1 and both of said pistons being of equal size.

3. The invention in accordance with claim 1 or claim 2 and said cylindrical housing comprising a pair of discrete cylinders having a common head plate and port means in said head plate operatively associated with said hydraulic circuit and communicating with each of said cylinders.

* * * * *